(12) United States Patent
Matsushita et al.

(10) Patent No.: US 8,215,434 B2
(45) Date of Patent: Jul. 10, 2012

(54) CONSTRUCTION MACHINE

(75) Inventors: Makoto Matsushita, Inashiki-gun (JP); Masao Nakamura, Tsukuba (JP); Kazuhisa Tamura, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 498 days.

(21) Appl. No.: 12/529,739

(22) PCT Filed: Apr. 9, 2008

(86) PCT No.: PCT/JP2008/057377
§ 371 (c)(1), (2), (4) Date: Sep. 3, 2009

(87) PCT Pub. No.: WO2009/001607
PCT Pub. Date: Dec. 31, 2008

(65) Prior Publication Data
US 2010/0025136 A1 Feb. 4, 2010

(30) Foreign Application Priority Data

Jun. 26, 2007 (JP) ................................ 2007-167663

(51) Int. Cl.
*B60K 11/06* (2006.01)
(52) U.S. Cl. ..................................... 180/68.4; 180/68.1
(58) Field of Classification Search ................. 180/68.4, 180/68.1, 68.3
See application file for complete search history.

(56) References Cited

U.S. PATENT DOCUMENTS

| | | | | |
|---|---|---|---|---|
| 5,671,820 A * | 9/1997 | Kobayashi et al. | .......... | 180/68.1 |
| 5,791,301 A * | 8/1998 | Watanabe | .................. | 123/41.31 |
| 6,223,845 B1 * | 5/2001 | Miyachi et al. | .............. | 180/68.3 |
| 6,427,798 B1 * | 8/2002 | Imashige | ....................... | 180/309 |
| 6,540,036 B1 * | 4/2003 | Sugano | ......................... | 180/68.1 |
| 6,601,324 B2 * | 8/2003 | Iwasa et al. | ..................... | 37/347 |
| 6,745,860 B2 * | 6/2004 | Yabe | ............................ | 180/68.1 |
| 6,922,925 B2 * | 8/2005 | Watanabe et al. | ............... | 37/466 |
| 7,134,518 B2 * | 11/2006 | Arai et al. | ..................... | 180/68.1 |
| 7,451,843 B2 * | 11/2008 | Nakashima et al. | ......... | 180/68.1 |
| 7,513,326 B2 * | 4/2009 | Miyachi | ....................... | 180/68.4 |
| 7,828,097 B2 * | 11/2010 | Kondou et al. | ............... | 180/68.1 |
| 7,841,314 B2 * | 11/2010 | Nakashima et al. | ...... | 123/198 E |
| 7,874,390 B2 * | 1/2011 | Taniuchi et al. | ............. | 180/68.4 |
| 8,006,991 B2 * | 8/2011 | Taniuchi et al. | ........... | 280/164.1 |
| 8,037,963 B2 * | 10/2011 | Nishimura et al. | ........... | 180/291 |

FOREIGN PATENT DOCUMENTS

EP     1 832 731 A1     9/2007
(Continued)

*Primary Examiner* — Jeffrey J Restifo
(74) *Attorney, Agent, or Firm* — Mattingly & Malur, PC

(57) ABSTRACT

A counterweight (8) is attached to the rear side of a revolving frame (6), and an engine (9) is mounted in a transverse direction in front of the counterweight (8). A heat exchanger (12) is located on the left side of the engine (9), and a left-hand side door (17) is located on the left side of the heat exchanger (12). An air cleaner (24) is accommodated in an air cleaner chamber (19) which is provided in a space enclosed by the counterweight, left-hand side door and heat exchanger. In this state, a casing (25) of the air cleaner has an opening portion (25A) to permit insertion and extraction of a filter element (26). Thus, at the time of a maintenance work for the air cleaner, one can draw out the filter element from the opening portion of the casing simply by opening the left-hand side door.

8 Claims, 9 Drawing Sheets

FOREIGN PATENT DOCUMENTS

| | | |
|---|---|---|
| JP | 56-77426 U | 6/1981 |
| JP | 8-268091 A | 10/1996 |
| JP | 9-221789 A | 8/1997 |
| JP | 2000-144811 A | 5/2000 |
| JP | 2004-190276 A | 7/2004 |
| JP | 2004-293183 A | 10/2004 |
| JP | 2006-206034 A | 8/2006 |
| JP | 2007-120188 A | 5/2007 |

* cited by examiner

CONSTRUCTION MACHINE

TECHNICAL FIELD

This invention relates to construction machines such as hydraulic excavators and hydraulic cranes, and more particularly to a construction machine, which is provided with an air cleaner for cleaning engine intake air.

BACKGROUND ART

Generally, a construction machine like a hydraulic excavator which is built of a vehicular lower structure, an upper revolving structure swingably mounted on the vehicular lower structure, and a working mechanism liftably mounted at the front of the upper revolving structure and a ground excavating operation is performed by lifting up and down the working mechanism.

The upper revolving structure is largely constituted by a revolving frame having the working mechanism mounted at a front side, a cab which is mounted in a left front side of the revolving frame and an operator gets on board, a counterweight which is provided at the rear portion of the revolving frame as a weight balance relative to the working mechanism, an engine which is mounted on the revolving frame at a position on the front side of the counterweight, a heat exchanger which is composed of a radiator and an oil cooler which are located on one side of the transverse direction of the engine, an air intake pipe which is connected to an intake port of the engine, and an air cleaner which is connected to an upstream end of the air intake pipe and remove dust from engine intake air with a filter element.

On the other hand, there have been in use the so-called mini size hydraulic excavators each equipped with an upper revolving structure which is appreciably reduced in size to permit swing motions even in a narrow limited space free of interference with surrounding objects. More specifically, an upper revolving structure on a mini size hydraulic excavator of this sort is formed in a circular shape in section within limits of vehicle width of the vehicular lower structure. Therefore, an upper revolving structure does not have an ample space for onboard equipments. That is to say, a lot of onboard equipments are necessarily confined to a narrow space.

In this connection, the above-mentioned air cleaner, i.e., one of onboard equipments usually requires periodical cleaning or replacement of a filter element which is fitted in a casing. However, in the case of a small size hydraulic excavator, it is difficult to secure a sufficient space around the air cleaner for mounting and dismantling a filter element.

Therefore, it has been the usual practice for mini size hydraulic excavators of the prior art to mount an air cleaner vertically and mount or dismantle filter elements in the vertical direction. Accordingly, a filter replacement hole which lets filter elements pass through is provided at the bottom plate of the revolving frame positioned in a mounting or dismantling direction of the filter element. A cover plate is attached to the bottom plate of the revolving frame by the use of a plural number of bolts to close the filter replacement hole when there is no need for mounting or dismantling filter elements (see, for example, Patent Literature 1: Japanese Patent Laid-Open No. H9-221789).

By the way, in the invention of Patent Literature 1 just mentioned, considerable time and efforts are required for loosening and tightening a plural number of bolts which fix the cover on the bottom plate when mounting or dismantling filter elements of the air cleaner in a vertical direction, giving rise to a problem of low efficiency.

In addition, a filter element can be dropped by mistake due to difficulty of handling at the time of extracting a filter element from a casing of the air cleaner through a narrow filter replacement hole in the bottom plate of the revolving frame.

DISCLOSURE OF THE INVENTION

In view of the above-discussed problems with the prior art, it is an object of the present invention to provide a construction machine which is arranged in such a way that one can carry out maintenance jobs efficiently in a facilitated manner, making an ample working space available for insertion and extraction of a filter element with a simple operation even in a case where the air cleaner is installed in a very narrow space.

(1) A construction machine according to the present invention, having a vehicular lower structure, an upper revolving structure swingably mounted on the vehicular lower structure, and a working mechanism provided at the front of the upper revolving structure; the upper revolving structure being comprised of a revolving frame serving as a support structure, a counterweight attached to a rear end of the revolving frame as a weight balance relative to the working mechanism, the counterweight having right and left ends formed in an arcuately curved shaped toward forward direction, an engine transversely mounted on the revolving frame at a position in front of the counterweight, a heat exchanger located at one side of transverse direction of the engine to cool fluid, a side door comprised as a part of an exterior housing cover and openably and closably provided at a position on one side of the heat exchanger and on one of transverse sides of the counterweight, an air cleaner chamber substantially triangular shape enclosed by the counterweight, side door and heat exchanger, an air intake pipe having one end located in the air cleaner chamber and having the other end connected to an intake side of the engine, and an air cleaner located in the air cleaner chamber and provided at one end side of the air intake pipe to separate dust from the air by a filter element.

The construction machine according to the invention is characterized in that the air cleaner having an opening portion to permit insertion and extraction of the filter element and the opening portion is disposed in such a way as to face the side door.

With the arrangements just described, at the time of carrying out a maintenance work of the air cleaner, for example, an opening portion of the air cleaner opens its faced side door. Since this side door is able to be unlocked and opened wide by operating an unlocking member on a door grip, an air cleaner chamber can be widely opened. By so doing, when the side door is at the opened state, one can extract a filter element by pulling it straightly through the opening portion of the air cleaner without being obstructed by nearby onboard equipments. A filter element which has received a maintenance and service treatment or a fresh filter element can be loaded only by putting it from the opening portion toward the inward portion.

Thus, even in the case of a small size construction machine having an air cleaner installed necessarily in a very narrow space, an ample working space becomes available simply by opening the side door at the time of loading or unloading a filter element. On such an occasion, a filter element can be loaded into or unloaded simply pushing or pulling same straight in an inward or outward direction. This contributes to enhance the efficiency of maintenance work to a significant degree.

(2) In this instance, according to the present invention, the air cleaner is mounted in a transverse state with the opening portion of the air cleaner in face to face relation with the side door.

With the arrangements just described, since an air cleaner located in a transverse direction permits its opening portion face toward a side door, the filter element can be loaded or unloaded simply by inserting and extracting the filter element in a transverse direction using a broad space around an upper revolving structure upon opening this side door.

(3) According to the present invention, the air cleaner is located in a transverse state at least in a posture substantially parallel with the horizontal.

In this case, the transversely mounted air cleaner which is disposed at least substantially parallel with the horizontal can insert and extract a filter element in a horizontal direction and mount or dismantle the filter element in an extremely facilitated manner.

(4) Further, according to the present invention, the air cleaner is composed of a casing formed as a tubular container with the opening portion at a fore end thereof, and a filter element accommodated in the casing in a possible state of insertion and extraction through the opening portion.

Thus, since the opening portion at a front end of the casing formed as a tubular container is positioned to face toward the side door, a filter element can be put into or out the casing through the opening portion readily after opening the side door.

(5) According to the present invention, a box-like air inlet housing is attached to the casing of the air cleaner, in a space between said casing and said side door.

Thus, a box-like air inlet housing can be attached for introducing atmospheric air to a casing of the air cleaner by the use of a narrow space between the casing and the side door.

(6) According to the present invention, a midway portion of the air intake pipe being arrange to ride over a front portion of the heat exchanger and one end of the air intake pipe connecting to the air cleaner.

In this case, a midway portion of the air intake pipe, which supplies cleaned air from the air cleaner to the engine, is arranged to ride over a front portion of the heat exchanger, free of interferences with and out of the way of performances of various maintenance and service jobs such as cleaning of dust protective screens and radiator and inspection and refilling of cooling water, ensuring to perform these jobs accurately within a shortened period of time.

(7) According to the present invention, the construction machine may further comprising a cab built on a front side of the revolving frame positioned at one side of transverse direction, the heat exchanger being located on the rear side of the cab, and the air cleaner chamber being in the form of a substantially triangular space enclosed by the cab, the counterweight, the side door, and the heat exchanger.

Thus, in this case, a substantially triangular space which is enclosed by the cab, counterweight, side door and heat exchanger can be utilized as an air cleaner chamber for installation of an air cleaner.

(8) According to the present invention, the heat exchanger is located in a position between the counterweight and the cab, and the air intake pipe has a midway portion en route, which midway portion being arranged to run along a rear panel of the cab and then ride over a front portion of the heat exchanger.

Thus, in this case, the heat exchanger can be located efficiently between the counterweight and the cab. In addition, the midway portion of the air intake pipe is arranged to run along the rear side of the cab and then ride over a front portion of the heat exchanger, permitting to carry out maintenance and service jobs efficiently in a shortened time period, including cleaning and inspection of the heat exchanger and refilling of cooling water.

(9) Further, according to the present invention, the counterweight is composed of a center weight portion of a larger height and left and right side weight portions of a smaller height extending arcuately in rightward and leftward directions from the center weight portion, the side door is located at a position on one of the side weight portions of the counterweight and between a rear panel of the cab and the center weight portion, and the air cleaner is installed in the air cleaner chamber at a position behind the cab.

In this case, right and left side weight portions of a smaller height are provided on the both opposite sides of a center weight portion of a larger height, so that it becomes possible to increase the heaviness of the counterweight by way of the two side weight portions. Therefore, even in the case of a construction machine of a small revolving radius, a counterweight of a sufficient heaviness can be mounted in a small limited space. Besides, a side door can be fitted by the use of a difference in level between the center and side weight portions.

DESCRIPTION OF REFERENCE NUMERALS

Figure 1:
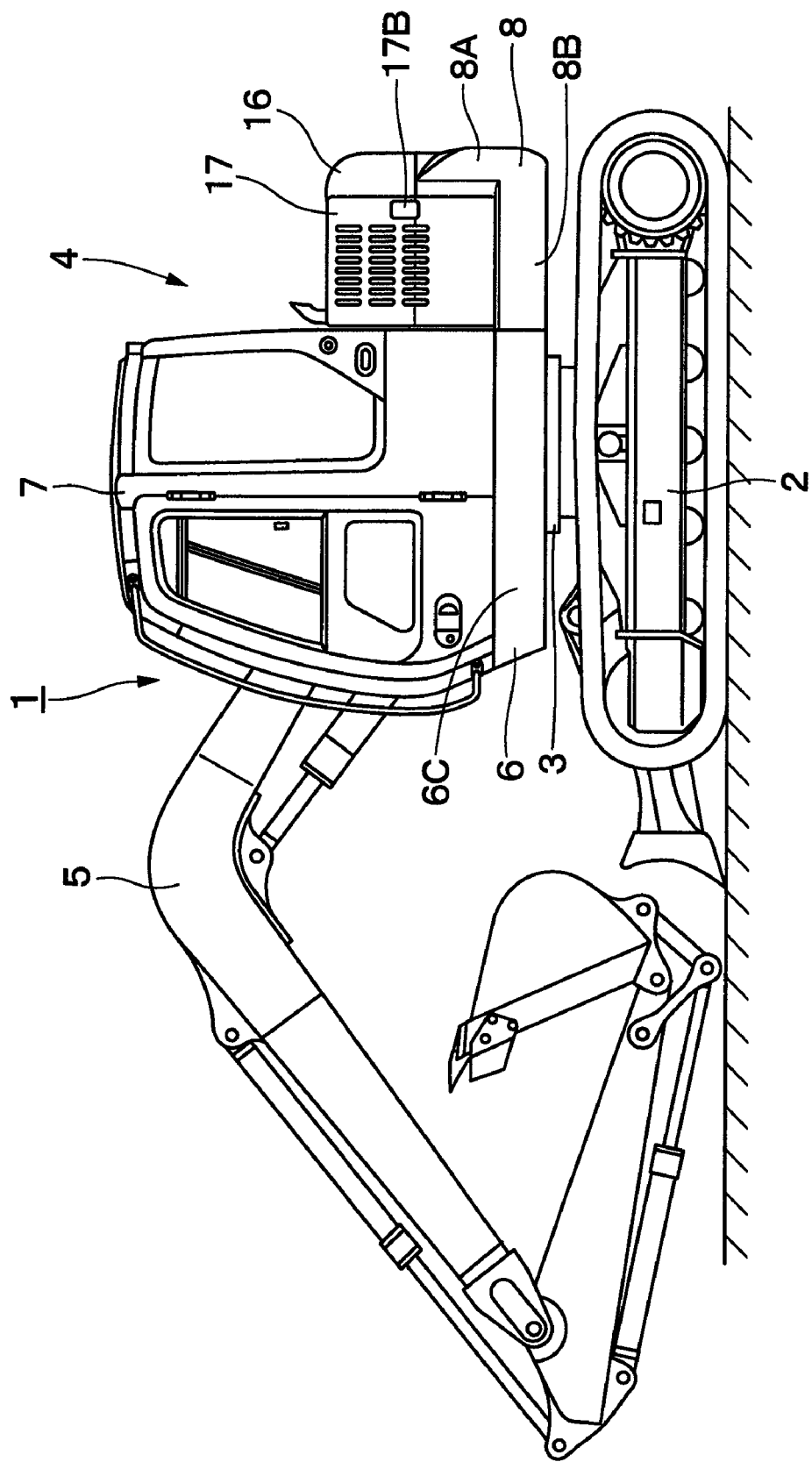
FIG. 1 is a front view illustrating a hydraulic excavator according to an embodiment of the present invention.

1: Hydraulic excavator (construction machine)
2: Vehicular lower structure
4, 31: Upper revolving structure
5: Working mechanism
6: Revolving frame
7: Cab
8: Counterweight
8A: Center weight portion
8B: Left weight portion
8C: Right weight portion
9, 9': Engine
12, 12': Heat exchanger 13, 13': Oil cooler
14, 14': Radiator
15, 15': Intercooler
16: Exterior housing cover
17: Left-hand side door
18: Right-hand side door
19: Air cleaner chamber
20: Fuel tank
21: Operating oil tank
23, 23': Air intake pipe
23A: Midway portion
24, 24', 24'': Air cleaner
25: Casing
25A: Opening portion
26: Filter element
27: Set screw
28: Air inlet housing
O: Center of revolving
R: Radius of revolving

BEST MODE FOR CARRYING OUT THE INVENTION

Hereafter, with reference to FIGS. 1 through 7 of the accompanying drawings, a detailed description will be given of an ultra-mini rear revolving type hydraulic excavator, taken as a typical example of construction machines in accordance with an embodiment of the present invention.

In FIG. 1, indicated at 1 is a hydraulic excavator as an example of construction machines. The hydraulic excavator 1 is built in a form which generally called ultra-mini rear revolving type hydraulic excavator having an upper revolving structure 4 which can be put in swing motions within a range substantially corresponding to a transverse width of a vehicle body of a vehicular lower structure 2, which will be described hereinafter. The hydraulic excavator 1 is largely constituted by an automotive crawler type vehicular lower structure 2, an upper revolving structure 4 which is swingably mounted on the vehicular lower structure 2 through a revolving ring 3, and a working mechanism 5 liftably mounted at the front of the upper revolving structure 4 to perform a ground excavating operation and other ground work.

Figure 2:
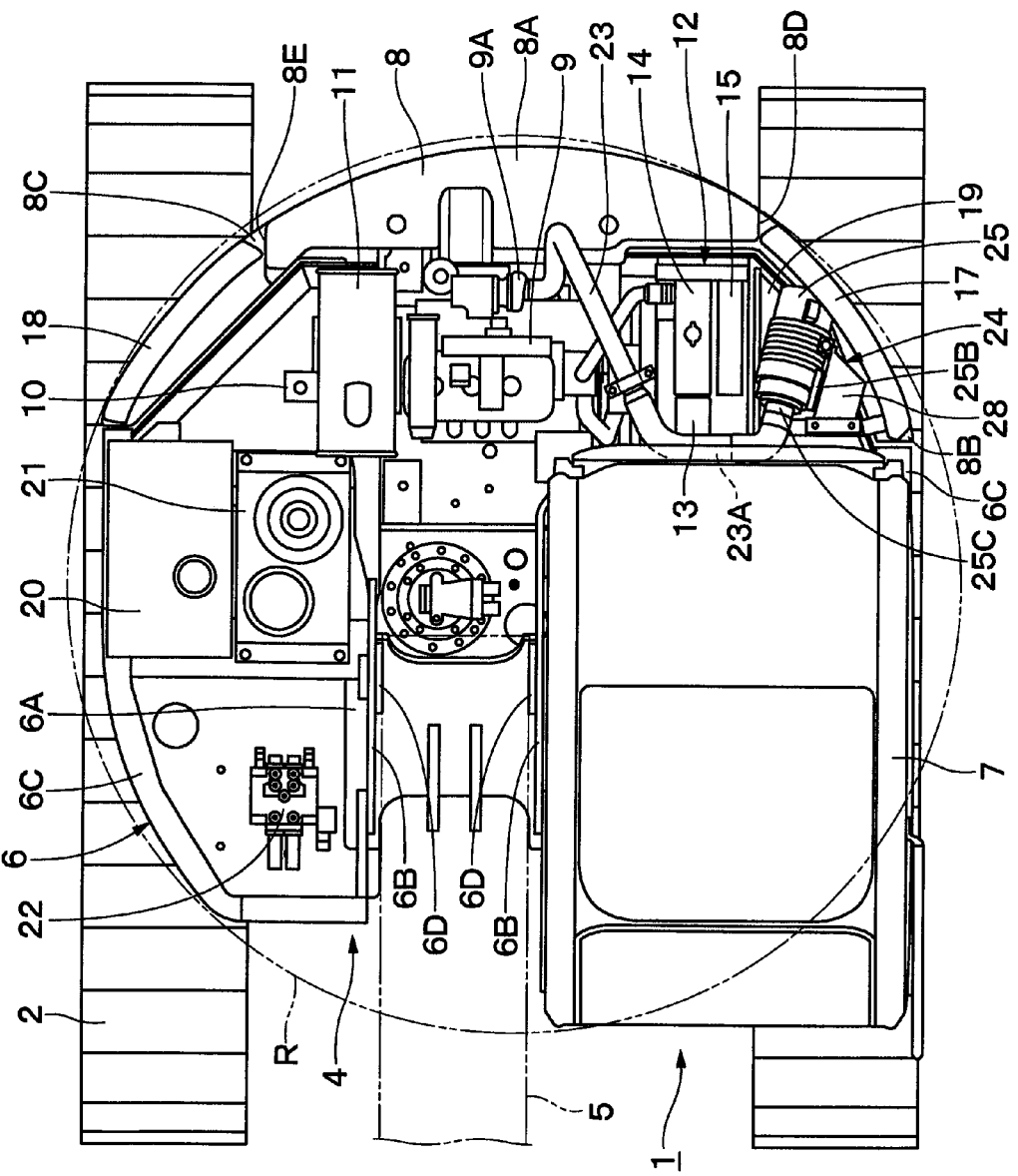
FIG. 2 is a plan view on an enlarged scale of the hydraulic excavator of FIG. 1, with an exterior housing cover removed state.
Figure 3:
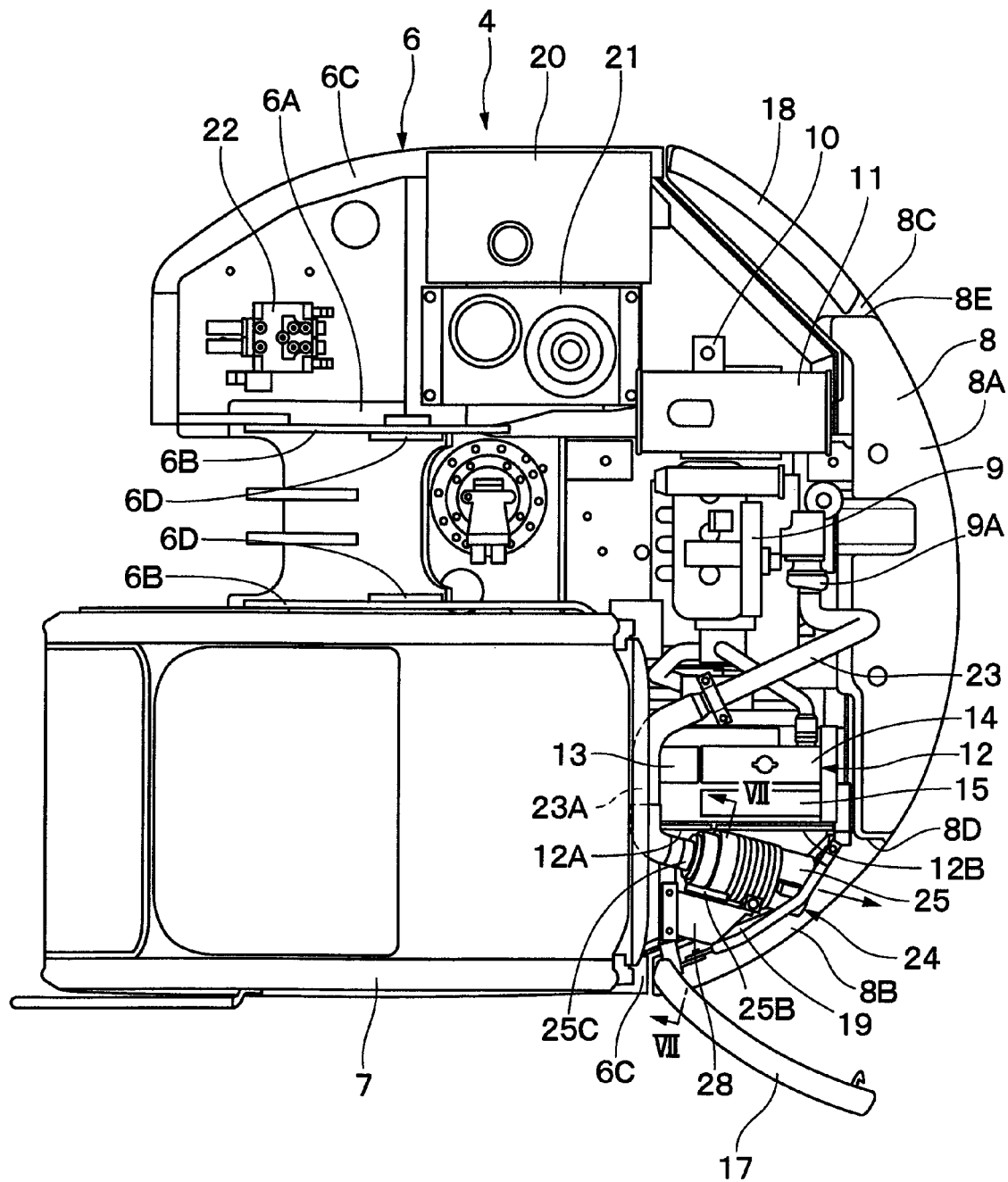
FIG. 3 is a plan view on an enlarged scale of an upper revolving structure of FIG. 2, with a left-hand side door in an opened state.

Further, as shown in FIGS. 2 and 3, the upper revolving structure 4 is largely constituted by a revolving frame 6, cab 7, counterweight 8, engine 9, heat exchanger 12, side doors 17 and 18, air intake pipe 23 and air cleaner 24, which will be described hereinafter. In this instance, as seen in FIG. 2, the upper revolving structure 4 is built to have a radius of revolving R so that it can be put in a swing motion about a center of revolving O in a limited range which will not run out of the width of the vehicle body of the vehicular lower structure 2. Thus, even the rear side of the upper revolving structure 4 (i.e., the counterweight 8, which will be described hereinafter) is located within a range which is encompassed by the radius of revolving R. That is to say, the upper revolving structure 4 is built to have a short length between the center of revolving O and its rear end, necessarily locating a front end of a left weight portion 8B of the counterweight 8 in close proximity to rear side of the cab 7.

Indicated at 6 is a revolving frame serving as a support frame for the upper revolving structure 4, the revolving frame 6 being largely composed of a bottom plate 6A which is extended in forward and rearward directions, right and left vertical plates 6B which are mounted on the bottom plate 6A and extended in forward and rearward directions in laterally spaced relations with each other, and right and left side frames 6C which are located in spaced positions on the right and left vertical plates 6B and extended in forward and rearward directions, respectively. Further, boom mounting brackets 6D are securely fixed to the left and right vertical plates 6B at intermediate positions in the longitudinal direction of the latter to support thereon a foot portion of a boom of the working mechanism 5.

Denoted at 7 is a cab which is built on the revolving frame 6. This cab 7 is occupied by an operator. In this instance, the cab 7 is located in a left front section on the revolving frame 6, that is, in a position on a left front side of the boom mounting brackets 6D which mount the working mechanism 5. Provided internally of the cab 7 are various control levers and switches along with an operator's seat (none of which are shown in the drawings).

Figure 5:
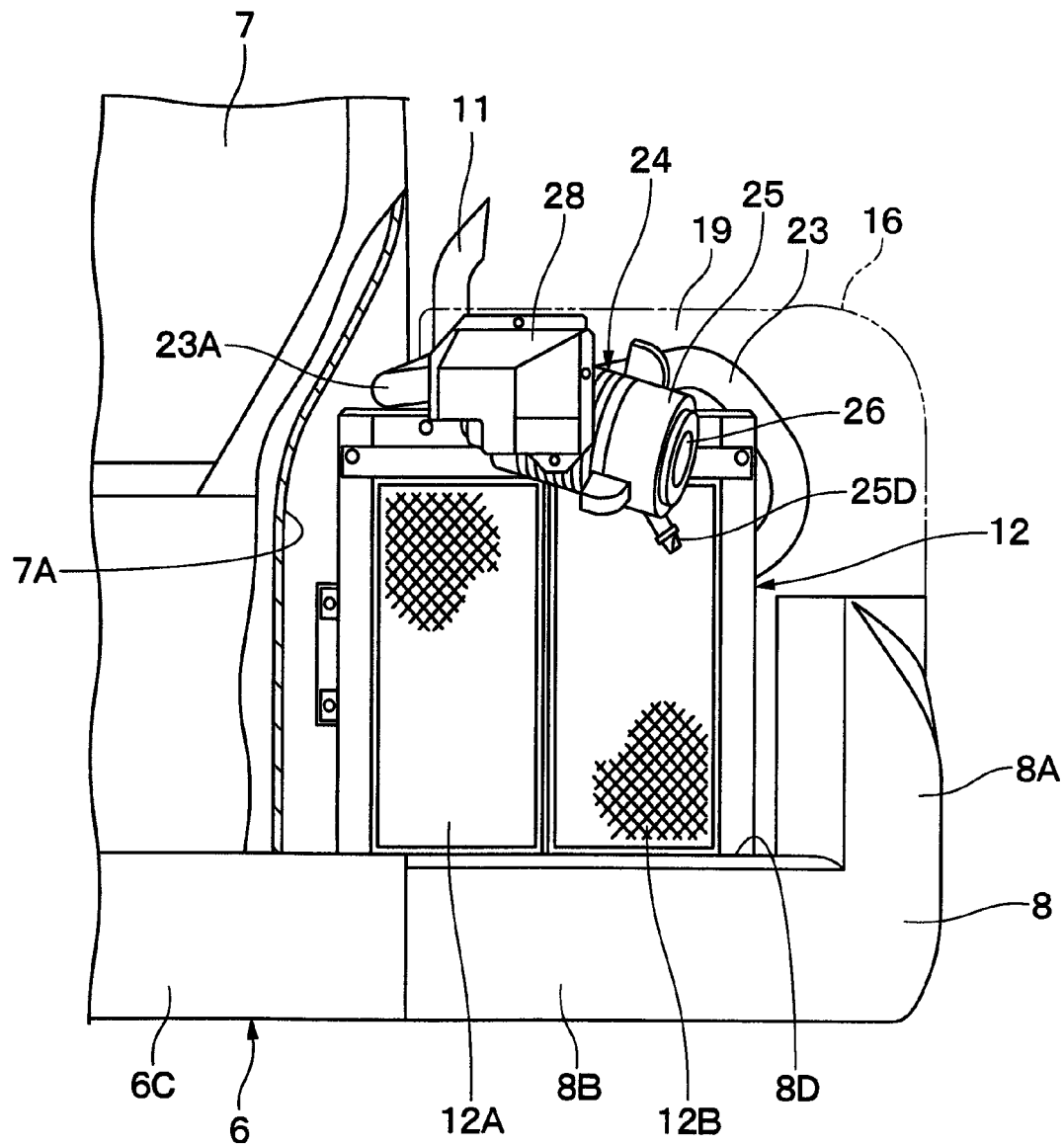
FIG. 5 is a front view on an enlarged scale of FIG. 4, with the left-hand side door in a removed state.

In this instance, a counterweight 8 is located in close proximity to the rear side of the cab 7 as usual, and this makes it difficult to secure a space for installation of an oil cooler 13 and a midway portion 23A of a clean air intake pipe 23, which will be described hereinafter. Therefore, as shown in FIG. 5, on the rear side, the cab 7 is inwardly indented (the cab room side) to provide a curvedly indented panel portion 7A in a lower portion of a rear panel to secure a space for installation of an oil cooler 13 and a midway portion 23A of an air intake pipe 23.

Indicated at 8 is a counterweight which is provided at a rear end of the revolving frame 6 as a weight balance relative to the working mechanism 5. In this instance, the counterweight 8 is positioned to fit in a revolving radius R with its right and left ends formed in an arcuately curved shape toward forward direction so that it always stays within a width of the vehicle body of vehicular lower structure 2 when the upper revolving structure 4 is put in a swing motion. Thus, the left end of the counterweight 8 is extended to a position in the proximity to the rear end portion of the cab 7, while the right end is extended to a position in the proximity to the rear side of a fuel tank 20, which will be described hereinafter.

Further, the arcuately shaped counterweight 8 is composed of a center weight portion 8A of a larger in height which is located at an intermediate position in the transverse directions, and left and right weight portions 8B and 8C of a smaller height which are extended in leftward and rightward directions from the center weight portion 8A while formed in an arcuately curved shape toward forward direction, respectively. Thus, a left door mount portion 8D is provided on the left side of the center weight portion 8A, that is, over the left weight portion 8B which is stepped down in level from the end face of the center weight portion 8A. Likewise, a right door mount portion 8E is provided on the right side of the center weight portion 8A, that is, over the right weight portion 8C which is stepped down in level from the end face of the center weight portion 8A.

The counterweight 8 of the above-described construction has an advantage that it heaviness can be increased by way of the left and right weight portions 8B and 8C which are provided on the both sides of the center weight portion 8A. That is to say, the counterweight 8 can be allotted with a necessary weight even in a case where a counterweight installation space is limited.

Indicated at 9 is an engine which is mounted on the revolving frame 6 at a position on the front side of the counterweight 8. This engine 9 is mounted transversely such as laying in left and right direction on a rear portion of the revolving frame 6 through vibration insulators (not shown). A hydraulic pump 10 is attached to the right side of the engine 9, and a heat exchanger 12 is located on the left side of the engine 9 as described in greater detail hereinafter. Further, a supercharger 9A like a turbocharger is attached to the rear side of the engine 9, the supercharger 9A being provided with connection ports for connection to both intake and exhaust sides of the engine 9. Connected to a connection port on the intake side of the supercharger 9A is an air intake pipe 23 which is connected from an air cleaner 24, which will be described hereinafter, while an exhaust pipe 11 is connected to a connection port on the exhaust side of the supercharger 9A.

Designated at 12 is a heat exchanger which is located on the left side of the engine 9 at a position between the cab 7 and counterweight 8. This heat exchanger 12 is composed of an oil cooler 13, radiator 14 and intercooler 15, and the like. The oil cooler 13, radiator 14 and intercooler 15 of the heat exchanger 12 are located in overlapping relations with each other in the direction of cooling air flow. The oil cooler 13 is located on the rear side of the cab 7 and on the front side of the radiator 14, and connected to operating oil tank 21 and control valve 22 which will be described hereinafter. The radiator 14 is located in a rear position on the side of the engine 9 (in the downstream side of cooling air flow), and connected to a water jacket (not shown) of the engine 9. Further, the intercooler 15 is located on the left side of the radiator 14 (in the upstream side of cooling air flow), side by side in overlapping relation with the latter, and connected to the supercharger 9A of the engine 9, and the like.

A front portion of the oil cooler 13 is received in an indented panel portion 7A of the cab 7. Thus, the oil cooler 13 and radiator 14 can be installed side by side between a limited narrow space between the rear side of the cab 7 and the counterweight 8.

In this instance, for example, a couple of dust protective screens 12A and 12B (see FIGS. 3 and 5) are fitted side by side in front and rear positions on the heat exchanger 12 in an upstream side of cooling air flow to trap dust which is entrained in cooling air. A midway portion 23A of an air intake pipe 23, which will be described hereinafter, is located on the front side portion of the oil cooler 13, so that the rear dust protective screen 12B can be removed quite easily simply by pulling same in an upward direction, evading the air intake pipe 23, and can be set in position again in an easy manner. On the other hand, the front dust protective screen 12A can also be removed easily by pulling same in an upward direction after shifting its position rearwards, and can be set in position again by reversing the above-described dismantling procedure.

Indicated at 16 is an exterior housing cover which is provided on the revolving frame 6 between the cab 7 and counterweight 8. This exterior housing cover 16 is arranged to cover from above the engine 9, heat exchanger 12 and air cleaner 24 which will be described hereinafter. The exterior housing cover 16 contains left- and right-hand side doors 17 and 18, which will be described hereinafter, and an engine cover (not shown).

Figure 4:
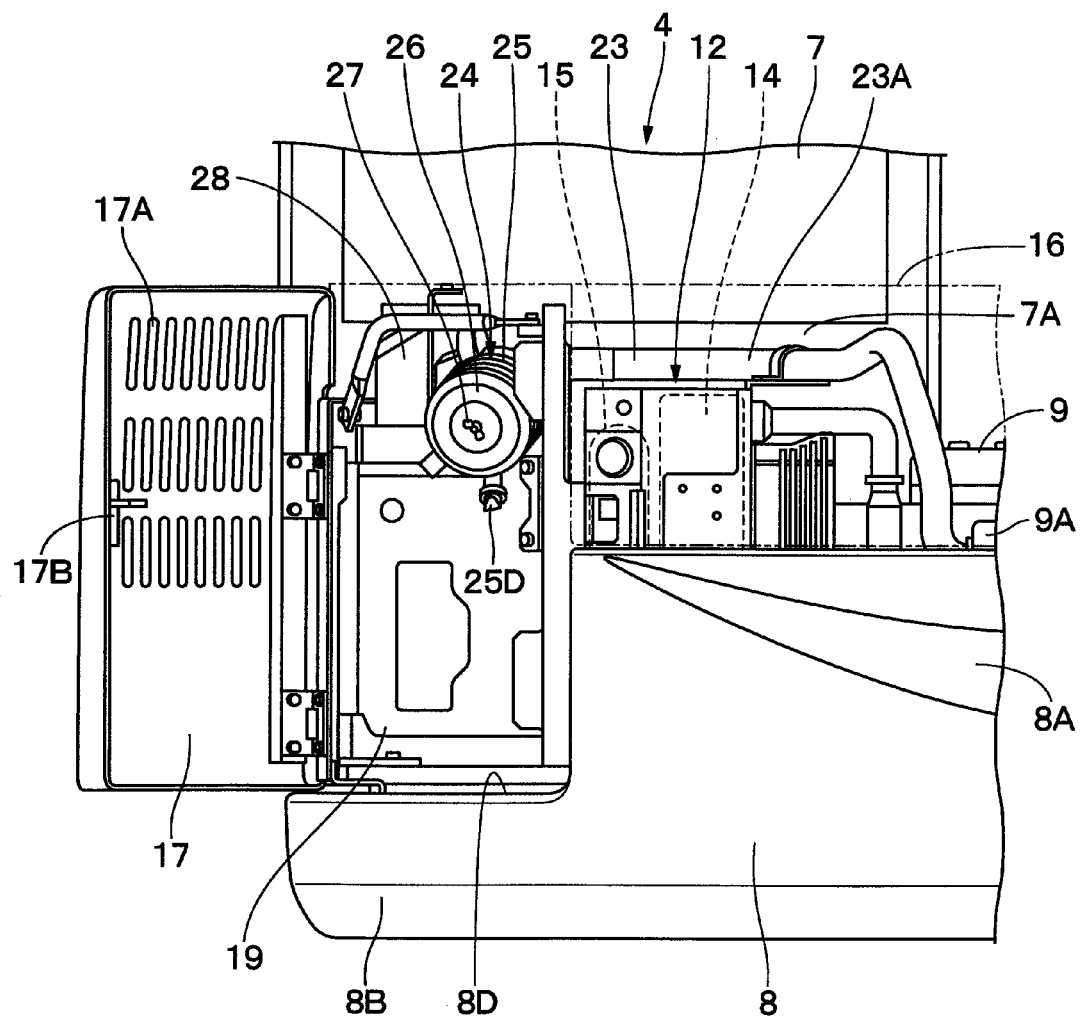
FIG. 4 is an enlarged view of essential parts of the left-hand side door in an opened state to expose an air cleaner to the outside, taken from the rear side.

Indicated at 17 is openable and closable left-hand side door which is comprised as a part of the exterior housing cover 16. More specifically, the left-hand side door 17 is fitted over the left weight portion 8B and between a rear panel of the cab 7 and the left door mount portion 8D of the counterweight 8. Further, the left-hand side door 17 is formed in an arcuate shape in conformity with the contour of the left weight portion 8B of the counterweight 8, and can be turned horizontally to an open or closed position about its rear end by making its front end as a fulcrum point. When fully opened, the left-hand side door 17 can largely uncover the left door mount portion 8D of the counterweight 8, as shown in FIGS. 3 and 4, to facilitate maintenance jobs to be performed on the air cleaner 24, which will be described hereinafter.

Further, a large number of slits 17A are formed in the left-hand side door 17 to take cooling air into the heat exchanger 12. An unlocking door grip 17B is attached to a fore end portion of the left-hand side door 17 thereby to unlock the door 17 when opening same.

On the other hand, indicated at 18 is an openable and closable right-hand side door which constitutes part of the exterior housing cover 16. This right-hand side door 18 is located in a position over the right weight portion 8C of the counterweight 8 and between the fuel tank 20 and a right door mount portion 8E. Similarly to the above-described left-hand side door 17, the right-hand side door 18 is formed in an arcuate shape in conformity with the contour of the right weight portion 8C of the counterweight 8.

Indicated at 19 is an air cleaner chamber which is provided in a left rear portion of the upper revolving structure 4. This air cleaner chamber 19 is a space of a substantially triangular shape which is defined by a rear panel of the cab 7 (indented panel portion 7A), left weight portion 8B of the counterweight 8, left-hand side door 17 and heat exchanger 12. The air cleaner chamber 19 is covered by the left-hand side door 17 on its left side, and covered by an engine cover portion (not shown) of the exterior housing cover 16 on its upper side. In other words, the triangular air cleaner chamber 19 is a space which is formed by adoption and location of the counterweight 8 of an arcuate shape, i.e., a space peculiar to an ultra-mini revolving type hydraulic excavator 1 or the like.

Indicated at 20 is a fuel tank which is mounted in a right side section of the revolving frame 6 and on the front side of the hydraulic pump 10, and at 21 is an operating oil tank which is located immediately on the left side of the fuel tank 20. Further, denoted at 22 is a control valve which is located on the front side of the tanks 20 and 21.

Indicated at 23 is an air intake pipe for leading clean air to the engine 9. An upstream end of the air intake pipe 23 is connected to an air cleaner 24 in the air cleaner chamber 19, which will be described hereinafter. The other end of the air intake pipe 23 is connected to an intake side of the supercharger 9A of the engine 9. In this instance, a midway portion 23A of the air intake pipe 23 is bent in U-shape backward over a front portion of the heat exchanger 12. Namely, the midway portion 23A of the air intake pipe 23 is arranged to run along the rear panel of the cab 7, partly in and along the indented panel portion 7A of the cab 7, and then ride over a front portion of the oil cooler 13 from the upper side. Thus, the midway portion 23A of the air intake pipe 23 is located in such a position which would not interfere with access to the dust protective screen 12A or the radiator 14 at the time of cleaning same or at the time of refilling cooling water.

Now, indicated at 24 is an air cleaner which is transversely mounted in the air cleaner chamber 19 and said air cleaner 24 is connected to an outer upstream end of the air intake pipe 23 to supply clean air to the engine by removing dust from the intake air. The air cleaner 24 which is connected to the upstream end of the air intake pipe 23 is fixedly mounted on a frame structure on the side of the revolving frame 6.

Figure 6:
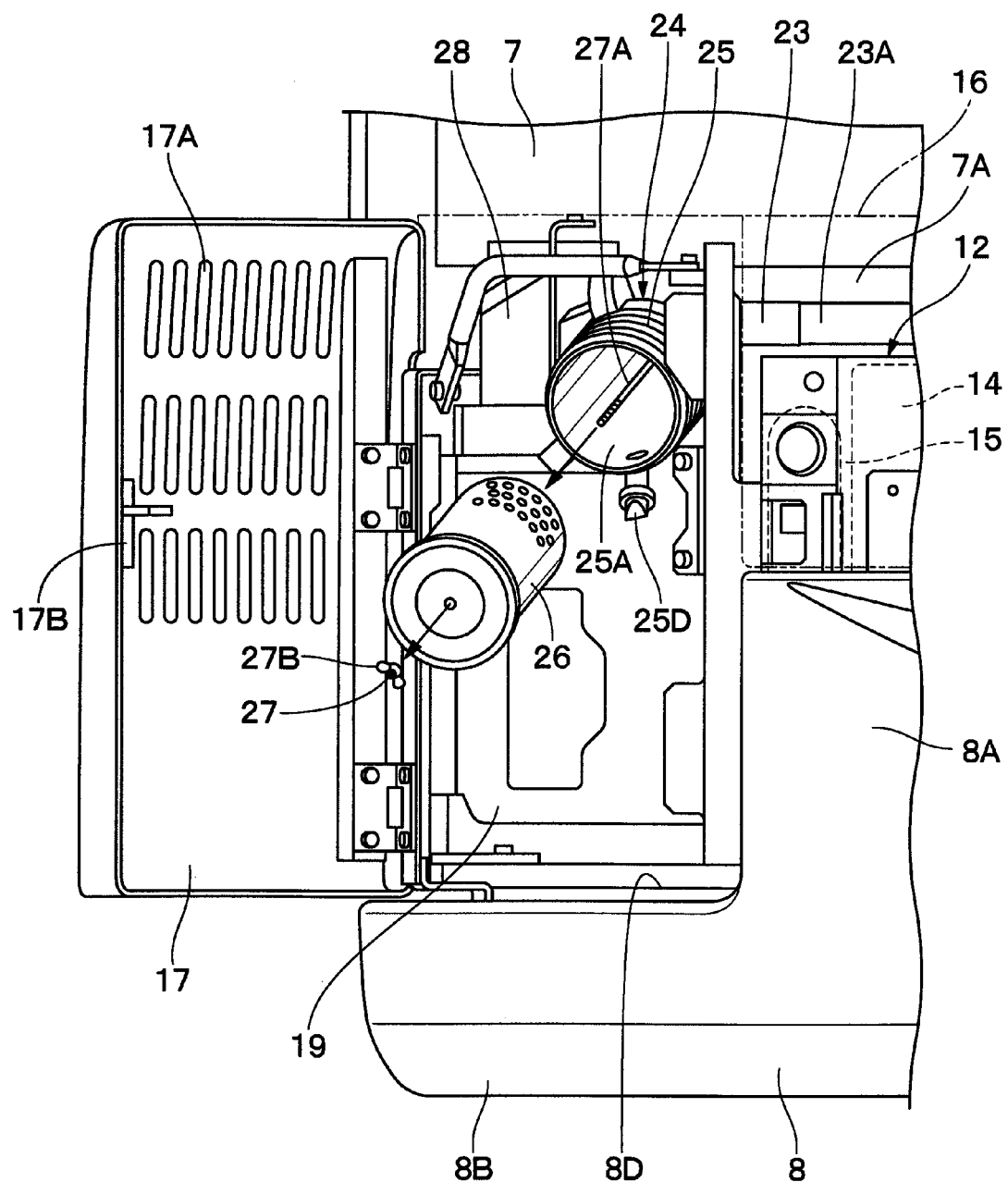
FIG. 6 is an enlarged view of essential parts taken from the same position as FIG. 4, with the left-hand side door in an opened position, showing an empty air cleaner void of a filter element.

As shown in FIG. 6, the air cleaner 24 is largely constituted by a tubular bottomed casing 25 with an opening portion 25A at front end which is formed as a tubular casing, a cylindrical filter element 26 extractably fitted in the opening portion 25A of the casing 25 to trap dust, a mount screw 27 thereby to fix the filter element 26 in the casing 25 in a hermetically closed state, and a box-like air inlet housing 28 which forms an air inlet side of the casing 25.

Figure 7:
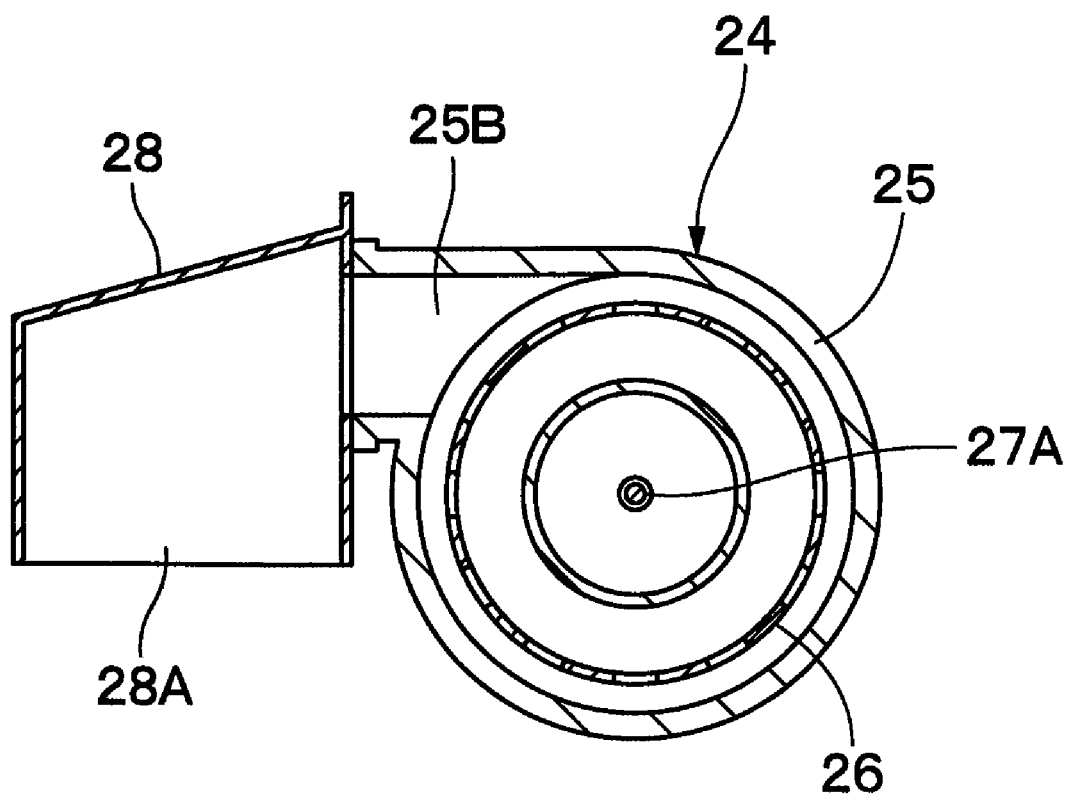
FIG. 7 is an enlarged sectional view taken from the direction of arrows VII-VII in FIG. 3, showing the inside of the air cleaner.

Further, as shown in FIGS. 3 and 7, an air inlet joint port 25B which is opened in a transverse direction is provided in an outer peripheral portion of the casing 25. This air inlet joint port 25B is opened to a tangential direction of the casing 25 to produce whirling cyclonic air streams within the casing 25. As shown in FIG. 3, an air outlet joint port 25C is provided centrally at the depth of the casing 25 for connection to the air intake pipe 23. Further, as shown in FIG. 4, a downward dust ejection port 25D is opened in an outer peripheral portion of the casing 25 for ejection of dust resulting from the cyclonic dust separation by the whirling cyclonic air streams.

On the other hand, the mount screw 27, serving to fixedly anchor the filter element 26 is constituted by a rod screw 27A which is extended longitudinally along the center axis of the casing 25, and a butterfly nut 27B which is threaded on an outer end of the rod screw 27A. The air inlet housing 28 is located at a lateral side of the casing 25 and in a small space between the rear panel (the indented panel portion 7A) of the cab 7 and left-hand side door 17, and connected to the air inlet joint port 25B of the casing 25. This air inlet housing 28 is formed in a box-like shape and adapted to take in air through an external opening 28A on the lower side for supplying into the casing 25.

In this instance, the casing 25 of the air cleaner 24 is fixed transversely across the air cleaner chamber 19 with the opening portion 25A disposed in face to face relation with the left-hand side door 17 to facilitate insertion or extraction of the filter element 26. More particularly, as shown in FIGS. 5 and 6, the air cleaner 24 is mounted transversely on top of the heat exchanger 12, in a slightly inclined posture relative to the horizontal. Nevertheless, the air cleaner 24 may be mounted in a horizontal state in the transversely direction, as described hereinafter.

Thus, when the left-hand side door 17 is opened, the opening portion 25A of the casing 25 comes out in an exposed state to outside, permitting to perform jobs such as inspection and cleaning of the air cleaner 24 and unloading and loading of the filter element 26 by the use of a broad space which is available around the upper revolving structure 4. Separated dust in the casing 25 can be dropped toward the dust ejection port 25D on the front side.

With the above-described arrangements, the hydraulic excavator 1 of the present embodiment is put in operation in the manner as follows.

In the first place, a drive control lever is manipulated by an operator in the cab 7, driving the vehicular lower structure 2 to put the hydraulic excavator 1 in travel in a forward or reverse direction. Otherwise, by manipulation of operating levers (both not shown), the working mechanism 5 can be lifted up and down to carry out, for example, a ground excavating operation.

Next, the case necessity for cleaning the air cleaner 24 will be explained. In this case, the left-hand side door 17 is swung open by turning the door grip 17B of the left-hand side door 17 (see FIG. 4). In this state, the butterfly nut 27B on the mount screw 27 will be loosened as shown in FIG. 6. Then, the filter element 26 can be unloaded by straightly pulling the filter element 26 from the opening portion 25A of the casing 25 which is positioned in a transverse direction. Thus, the filter element 26 can be cleaned simply by loosening the mount screw 27. Besides, the filter element 26 can be reloaded simply by pushing same into the casing 25 through the opening portion 25A toward the inward portion.

As described above, according to the present embodiment, the filter element 26 can be loaded into or unloaded from the casing 25 of the air cleaner 24 through the opening portion 25A which is disposed to face toward the left-hand side door 17. That is to say, at the time of performing a maintenance work for the air cleaner 24, one can secure an ample working space around the air cleaner 24 simply by opening the left-hand side door 17 which is faced toward the air cleaner 24.

As a result, when the left-hand side door 17 is at the open state, the filter element 26 can be unloaded easily in a short period of time without obstruction by nearby onboard equipments simply by straightly pulling the filter element 26 from the opening portion 25A of the casing 25. Moreover, the filter element 26 whose maintenance is completed or new filter element 26 can be loaded easily, simply by pushing same into the casing 25 through the opening portion 25A toward the inward portion.

Thus, even in the case of an ultra-mini rear swing machine like the hydraulic excavator 1 having an air cleaner 24 installed in a narrow space, one can secure an ample working space simply by pulling the door grip 17B to unlock and open the left-hand side door 17 at the time of loading or unloading the filter element 26. The filter element 26 can be pushed into or pulled out very easily, permitting to carry out a maintenance and service work in an efficient manner while preventing the filter element 26 from being dropped clumsily and improve reliability and the like.

The casing 25 of the air cleaner 24 is mounted transversely and substantially in a horizontal state, with the opening portion 25A of the casing 25 faced toward the left-hand side door 17. Accordingly, upon opening the left-hand side door 17, one can pull out the filter element 26 straight toward oneself or straightly push in the filter element 26 in a transverse direction easily by the use of an ample space which is available around the upper revolving structure 4.

Further, the air intake pipe 23 which is connected between the engine 9 and air cleaner 24 is arranged to ride over a front portion of the oil cooler 13 in the midway portion 23A. That is to say, the midway portion 23A of the air intake pipe 23 is located free of interferences with various maintenance and service jobs, such as cleaning jobs on the dust protective screens 12A of the heat exchanger 12 and radiator 14, and inspection and refilling of cooling water, permitting to perform these jobs in an easy manner.

On the other hand, for introduction of atmospheric air, the box-like air inlet housing 28 is attached to the casing 25 of the air cleaner 24, utilizing a space between the casing 25 and the left-hand side door 17 without blocking cooling air streams.

Further, the radiator 14 is located on the side of the counterweight 8 and the oil cooler is positioned side by side behind the cab 7, while the midway portion 23A of the air intake pipe 23 is routed to run along the rear side of the cab 7 and then ride over a front portion of the oil cooler 13. Thus, the oil cooler 13 and the radiator 14 can be installed in an efficient manner in a limited space between the counterweight 8 and the cab 7.

Further, the counterweight 8 is composed of the center weight portion 8A of a relatively large height and the left and right weight portions 8B and 8C of a relatively small height which are extended arcuately to the left and right of the center weight portion 8A. On the other hand, the left- and right-hand side doors 17 and 18 are fitted over the left and right weight portions 8B and 8C, respectively.

With the arrangements just described, it becomes possible to increase the heaviness of the counterweight 8 effectively by way of the side weight portions 8B and 8C. Therefore, a sufficiently heavy counterweight can be mounted even if only a small limited space is available for a counterweight 8 as in the case of an ultra-mini rear swing type machine like the hydraulic excavator 1. Besides, the left-hand side door 17 can be mounted, utilizing a difference in level between the center weight portion 8A and the left weight portion 8B. Similarly, the right-hand side door 18 can be mounted, utilizing a difference in level between the center weight portion 8A and the right weight portion 8C.

Figure 8:
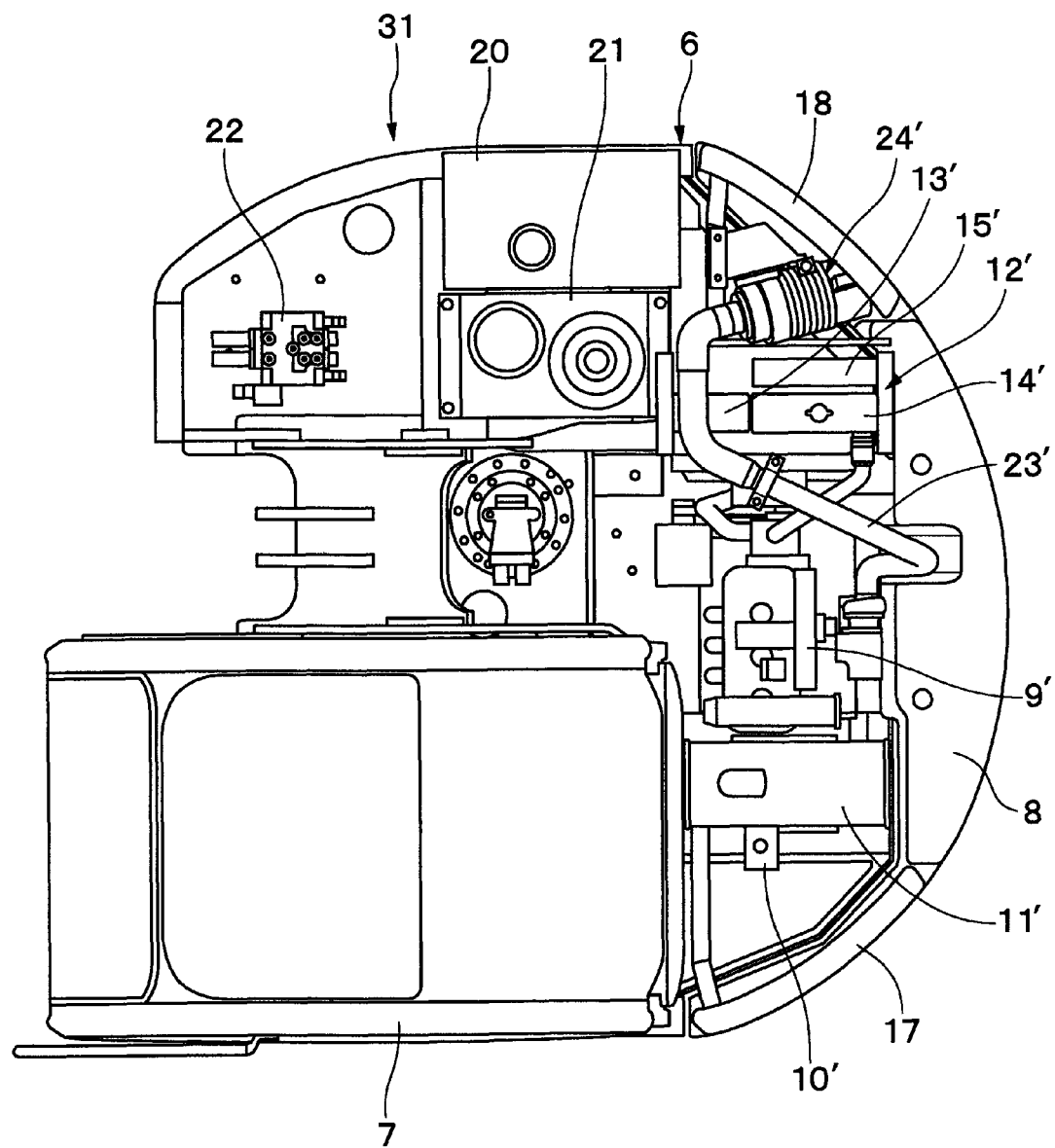
FIG. 8 is a plan view of an upper revolving structure in a first modification according to the present invention.

In the above-described embodiment, by way of example the air cleaner 24 is mounted in such a way as to face toward the left-hand side door 17. However, the present invention is not limited to this particular example. For instance, like an upper revolving structure 31 which is exemplified in a first modification shown in FIG. 8, an engine 9', hydraulic pump 10', exhaust pipe 11', oil cooler 13' of a heat exchanger 12', radiator 14', intercooler 15', air intake pipe 23' and air cleaner 24' can be mounted in reversed positions in the transverse direction, disposing an open end of the air cleaner 24' to face toward an right-hand side door 18.

Further, in the above-described embodiment, of the oil cooler 13 and radiator 14 of the heat exchanger, by way of example the oil cooler 13 is located in front of the radiator 14. However, the present invention is not limited to this particular example. For instance, if desired, the radiator 14 may be located in front of the oil cooler 13 by switching the positions of these components back to front or front to back.

Figure 9:
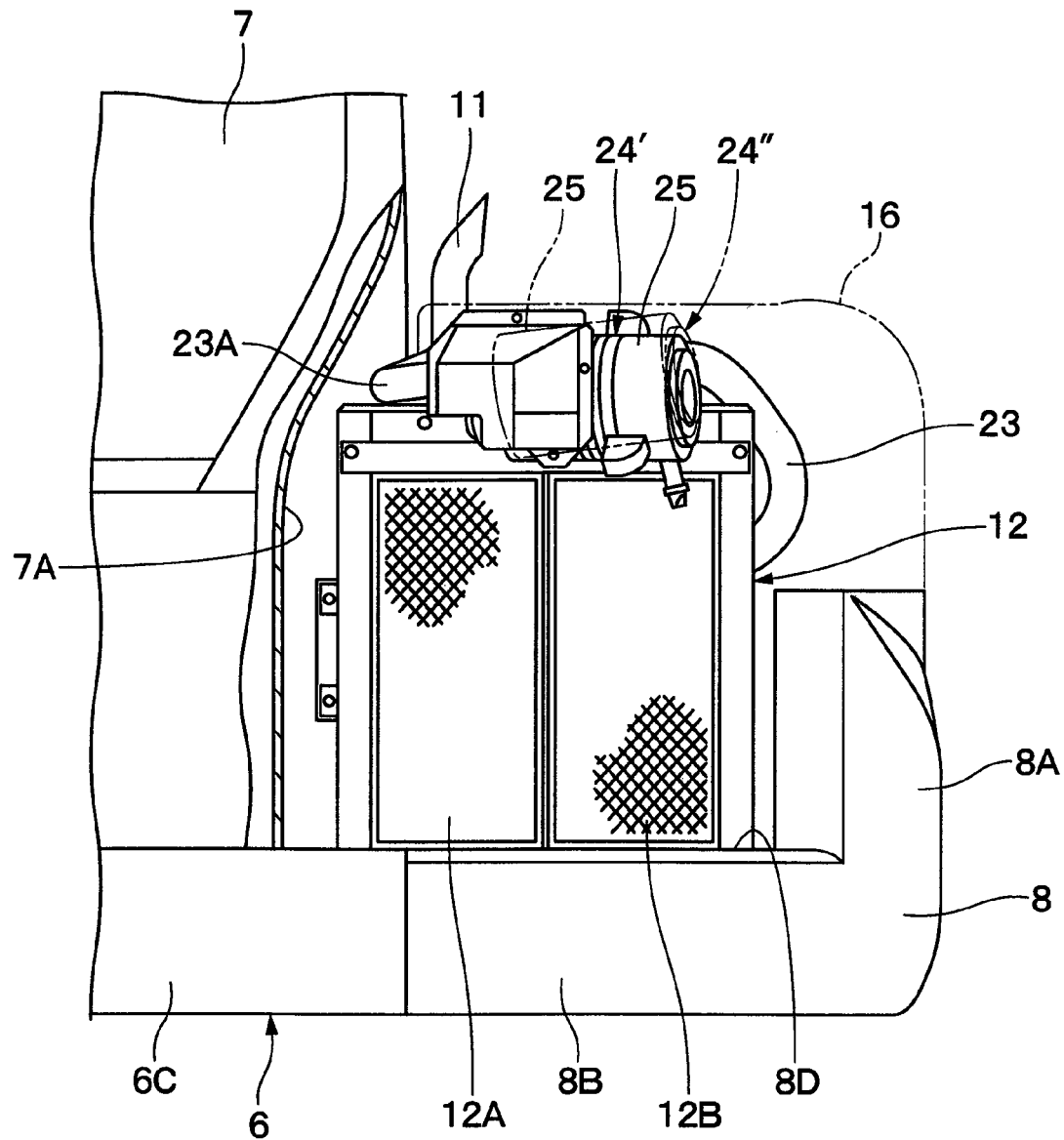
FIG. 9 is a front view on an enlarged scale of an air cleaner in a second modification according to the present invention, taken from the same position as FIG. 5.

Further, in the above-described embodiment, by way of example the air cleaner 24 is mounted with the opening portion 25A of its casing 25 slightly inclined downward relative to the horizontal. However, needless to say, the present invention is not limited to this particular example. For instance, as in a second modification shown in FIG. 9, an air cleaner 24' may be disposed horizontally in the transverse direction. Otherwise, as indicated by a two-dot chain line in FIG. 9, an air cleaner 24" may be mounted transversely, with its front side slightly raised relative to the horizontal. In short, according to the present invention, an air cleaner is mounted transversely in a horizontal or nearly horizontal state.

Furthermore, in the above-described embodiment, by way of example the present invention is applied to a hydraulic excavator 1 with a crawler type lower structure 2, taken as a typical example of construction machines. However, the present invention is not limited to this particular example, and is similarly applicable to a hydraulic excavator with a wheeled lower structure and to a wide variety of revolving type construction machines with a counterweight, including, for example, hydraulic cranes and earth drills other than the hydraulic excavator.

The invention claimed is:

1. A construction machine, having a vehicular lower structure, an upper revolving structure swingably mounted on said vehicular lower structure, and a working mechanism provided at the front of said upper revolving structure;

said upper revolving structure being comprised of a revolving frame serving as a support structure, a counterweight attached to a rear end of said revolving frame as a weight balance relative to said working mechanism, said counterweight having right and left ends formed in an arcuately curved shape toward forward direction, an engine transversely mounted on said revolving frame at a position in front of said counterweight, a heat exchanger located at one side of transverse direction of said engine to cool fluid, a side door comprised as a part of an exterior housing cover and openably and closably provided at a position on one side of said heat exchanger and on one of transverse sides of said counterweight, an air cleaner chamber substantially triangular shape enclosed by said counterweight, side door and heat exchanger, an air intake pipe having one end located in said air cleaner chamber and having the other end connected to an intake side of said engine, and an air cleaner located in said air cleaner chamber and provided at one end side of said air intake pipe to separate dust from the air by a filter element, characterized in that;

said air cleaner having an opening portion to permit insertion and extraction of said filter element and said opening portion is disposed in such a way as to face said side door, and a midway portion of said air intake pipe being arrange to ride over a front portion of said heat exchanger and one end of said air intake pipe connecting to said air cleaner.

2. A construction machine as defined in claim 1, wherein said air cleaner is mounted in a transverse state, with said opening portion of said air cleaner in face to face relation with said side door.

3. A construction machine as defined in claim 1, wherein said air cleaner is located in a transverse state at least in a posture substantially parallel with the horizontal.

4. A construction machine as defined in claim 1, wherein said air cleaner is composed of a casing formed as a tubular container with said opening portion at a fore end thereof, and a filter element accommodated in said casing in a possible state of insertion and extraction through said opening portion.

5. A construction machine as defined in claim 4, wherein a box-like air inlet housing is attached to said casing of said air cleaner, in a space between said casing and said side door.

6. A construction machine as defined in claim 1, further comprising a cab built on a front side of said revolving frame positioned at one side of transverse direction, said heat exchanger being located on the rear side of said cab, and said air cleaner chamber being in the form of a substantially triangular space enclosed by said cab, said counterweight, said side door, and said heat exchanger.

7. A construction machine as defined in claim 6, wherein said heat exchanger is located in a position between said counterweight and said cab, and said air intake pipe has a midway portion en route, which midway portion being arranged to run along a rear panel of said cab and then ride over a front portion of said heat exchanger.

8. A construction machine as defined in claim 6, wherein said counterweight is composed of a center weight portion of a larger height and left and right side weight portions of a smaller height extending arcuately in rightward and leftward directions from said center weight portion, said side door is located at a position on one of said side weight portions of said counterweight and between a rear panel of said cab and said center weight portion, and said air cleaner is installed in said air cleaner chamber at a position behind said cab.

* * * * *